Patented Sept. 15, 1931

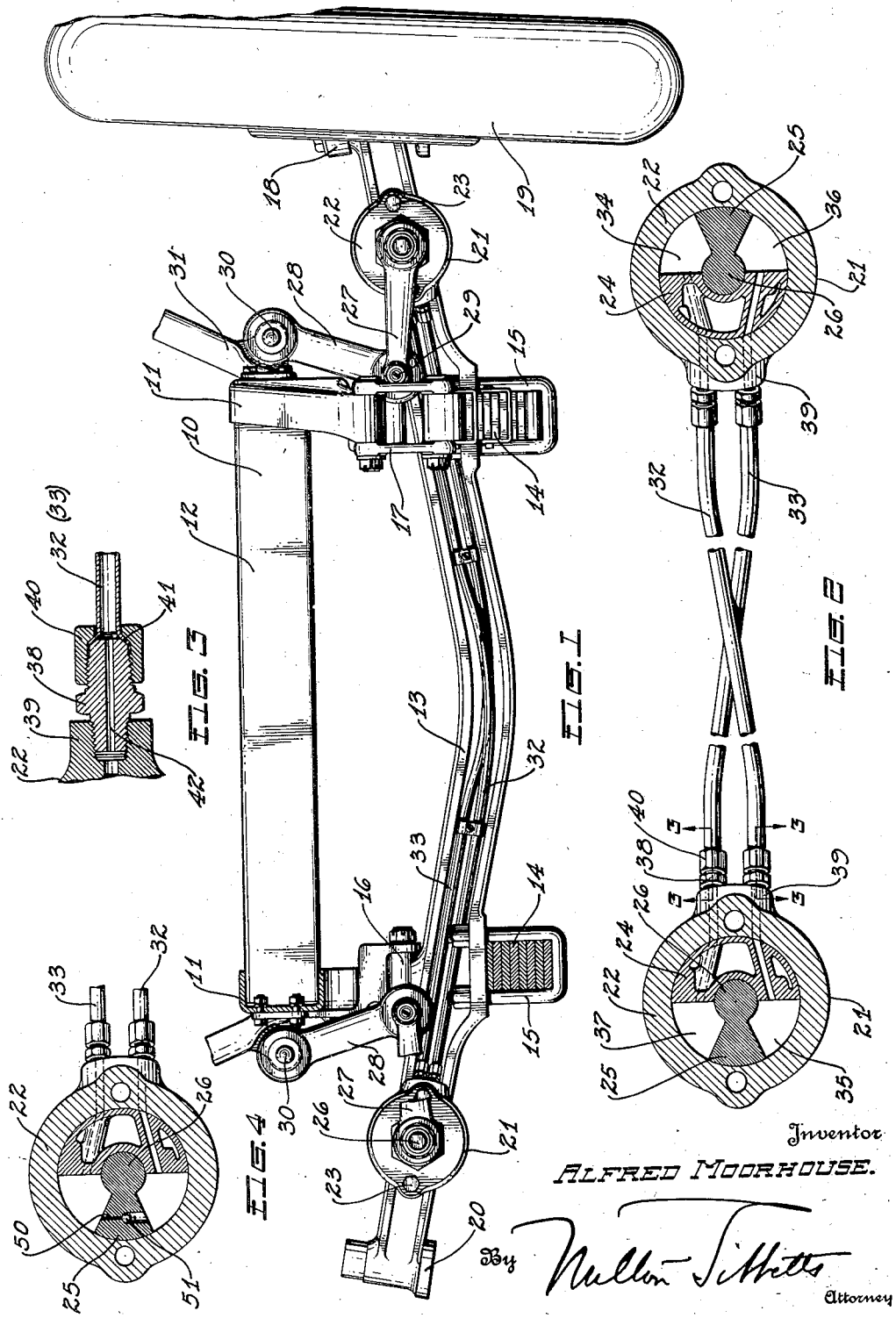

1,823,694

UNITED STATES PATENT OFFICE

ALFRED MOORHOUSE, OF DETROIT, MICHIGAN, ASSIGNOR TO PACKARD MOTOR CAR COMPANY, OF DETROIT, MICHIGAN, A CORPORATION OF MICHIGAN

MOTOR VEHICLE

Application filed November 17, 1927. Serial No. 233,839.

This invention relates to motor vehicles and particularly to means for controlling the relative movement of the axle and frame to improve the riding qualities of the vehicle.

With the more or less recent advent of low pressure tires on motor vehicles have come certain difficulties in the control of the spring action, and particularly the springs of the front or steering axle, and while the ordinary type of shock absorber or snubbing device has been of some value in controlling the axle movements, these have not proven entirely successful.

With the low pressure tires referred to, certain types of road surfaces, and particularly road surfaces that cause an unequal deflection of the springs on opposite sides of the vehicle, frequently cause a lateral vibration of the steering wheels of the vehicle sometimes referred to in the art as "wheel shimmy". These lateral movements take various forms and are mostly, if not all of them, produced or initiated by this uneven deflection of the springs or dissimilar movement of the axle ends relative to the frame.

It is one of the objects of the present invention to improve upon the control of the axle movements relative to the frame to thereby better the conditions under which the vehicle operates.

Another object of the invention is to so control the spring deflections relative to each other, or in other words, the movement of the axle ends relative to the frame, that there will be substantially a movement of translation of the axle relative to the frame, regardless of the road surface over which the vehicle is travelling.

Another object of the invention, or another form of statement of the invention, is the provision of means for resisting the non-synchronous or dissimilar movements of the axle ends relative to the frame to a greater extent than are the synchronous and similar movements of the axle.

More specifically, an object of the invention is to provide shock absorbing means operating to offer an increased resistance to non-synchronous or dissimilar movements of the axle ends relative to the frame.

Also, specifically, an object of the invention is to provide hydraulic shock absorbing means mounted at the axle ends and interconnected so that they will normally resist translatory movement of the axle while abnormally resisting any other movement of the axle relative to the frame.

Other objects of the invention will appear from the following description taken in connection with the drawings, which form a part of this specification, and in which:

Fig. 1 is an elevation view, with parts in section, showing the front end of a motor vehicle embodying the invention;

Fig. 2 is an enlarged view showing the shock absorbers in section and their interconnecting conduits;

Fig. 3 is an enlarged section substantially on the lines 3—3 of Fig. 2, and

Fig. 4 is a view similar to the left hand end of Fig. 2, illustrating a slightly modified form.

Referring to the drawings, 10 represents generally the frame of a motor vehicle, one of the side members 11 of which is shown in section and the other in front elevation. These side members are connected by a cross member 12. One of the axles of the vehicle is shown at 13 and in this instance it is the front or steering axle. The front springs 14 are underslung and are connected to the axle by U-bolts 15. The ends of the springs are connected to the frame, the rear pivotal connection being shown at 16 and the front shackle connection being shown at 17. Thus, the frame is supported on the axle through these springs 14.

At the ends of the axle 13 are the usual steering knuckles 18 by which the vehicle is steered and upon which are rotatively mounted the wheels 19. At the right of Fig. 1 the steering knuckle and wheel are shown, whereas at the left of that figure only the bearing portion 20 of the axle is shown, but it will be understood that both ends of the axle are similar in this respect.

The shock absorbing or axle control means, as illustrated herein, comprises two hydraulic shock absorbers connected between the frame and axle. These shock absorbers are similar in construction and are mounted upon the axles adjacent the ends thereof. The shock absorbers are indicated at 21 and their cylindrical casings 22 are shown bolted to the axle by bolts 23. Each casing has a partition or abutment 24 therein, as shown particularly in Fig. 2, and an oscillating vane type of piston 25 is mounted in the casing. The shaft 26 upon which the piston is mounted extends through one end of the casing and has mounted thereon an operating arm 27, which arm is connected to the frame of the vehicle through a link or connecting rod 28. A joint 29 connects the link 28 to the arm 27 and a similar joint 30 connects the link 28 to a bracket 31 secured on the side member of the frame.

In the conventional construction of shock absorbers of this general type there would be a by-pass for liquid from one side of the piston 25 to the other so that movement of the piston, caused by the movement of the axle relative to the frame, would be resisted by the liquid to a limited extent. In the present invention instead of by-passing the liquid from one side of the piston to the other, in the same shock absorber, the liquid is by-passed from one side of the piston of one shock absorber, to the opposite side of the piston of the other shock absorber. The same is true also of the other shock absorber in that a second by-pass is provided from one side of its piston to the opposite side of the piston of the first shock absorber.

As shown herein, these by-passes or conduits are in the form of pipes 32 and 33 extending from one shock absorber to the other and looking at the shock absorbers shown in Fig. 2, it will be seen that the pipe 32 connects the compartment 34 above the piston 25 of the right hand shock absorber with the compartment 35 below the piston 25 of the left hand shock absorber, and the pipe 33 connects the compartment 36 of the right hand shock absorber with the compartment 37 of the left hand shock absorber. The conduits forming continuations of pipes 32 and 33 within the casings 22 and partitions 24, are shown either in section or in dotted lines in Fig. 2.

It will be noted that the operating arms 27 of these shock absorbers are mounted on the opposite sides of the shafts 26 from the pistons 25 so that a downward movement of the frame, which means a downward movement of the ends of the arms 27, would cause a corresponding upward movement of the pistons 25. Now if the frame moves downwardly or the axle 13 moves upwardly relative to the frame, the movement being one of pure translation, or, in other words, if this relative movement is one in which the axle ends move synchronously and similarly relative to the frame, there will be a transfer of liquid from compartment 34 to compartment 35, or vice versa, and simultaneously from compartment 37 to compartment 36, or vice versa. Thus, this synchronous and similar movement of the axle will cause synchronous movement of the pistons 25, upwardly if the axle is moved upwardly, and this movement of the pistons will contract compartments 34 and 37 and expand compartments 36 and 35, and the liquid will be transferred from one to the other of these compartments through the pipes 32, as stated above.

Fig. 3 is an enlarged section through the connections of the pipes 32 and 33 to one of the shock absorbers, as shown by the lines 3—3 in Fig. 2. The pipe connection itself is indicated at 38, this being screwed into a boss 39 of the casing 22 of the shock absorber and a cap 40 is threaded on to the connection 38 and binds the expanded end 41 of the pipe 32 (33) to the connection. The connection 38 is drilled as at 42 to provide a through passage of restricted cross section from the pipe to the shock absorber and thus the amount of resistance to the passage of the liquid from one shock absorber to the other is definitely fixed by the cross sectional area of this passage 42. If this passage 42 is substantially the same size as the interior of the pipe 32 (33) then there will be practically no resistance to the passage of the liquid and consequently nominal resistance to the movement of the axle relative to the frame. But as shown, the passage 42 is restricted and consequently these shock absorbers will offer some resistance to the relative movement of the axle and frame when that movement is one of translation.

If the movement of the axle relative to the frame becomes other than a movement of translation, one of the pistons 25 immediately acts as an abutment and transfer of liquid from one shock absorber to the other is retarded to a greater degree than normally. Of course, if there were no leakage past either of the pistons there could be no differential movement of the axle ends at all, but since this is practically impossible, there will be a certain amount of slippage or give to this restraint of liquid transfer and the differential movement of the axle ends, while being retarded or restricted, will not be entirely prevented.

It will be understood that this greater resistance to relative movement of the axle and frame will occur whenever there is a tendency for the axle ends to move non-synchronously or to move dissimilarly. Thus, both axle ends may be moving upwardly but if one is moving faster than the other, or non-synchronously, the resistance will be greater due to the fact that one piston is not moving as fast as the other. Likewise, if one end of the axle is moving upwardly and the other downwardly, perhaps in synchronism and at the same speed, yet the movements will not be similar and one piston will be moving upwardly and the other downwardly and consequently each will be acting as an abutment for the other and a maximum of resistance will be offered.

These connections between the frame and axle therefore and these connections between the shock absorbers tend always toward a movement of pure translation for the axle relative to the frame, yet there is no mechanical forcing of that movement of translation to the extent where one end of the axle cannot make any movement without carrying the other end absolutely with it, both synchronously and similarly.

In Fig. 4 is illustrated a form of shock absorber, which may be the same at both ends of the axle, in which there is a check valve controlled by-pass 50 in the piston 25. The check valve is indicated at 51 and is arranged to close the by-pass on the down stroke of the piston, which is the up stroke or rebound of the frame relative to the axle, and the check valve opens the by-pass on the reverse movement. Thus there is greater resistance on the rebound than on the downward movement of the frame.

But here it is desirable that the passage 50 should be smaller or of less capacity than the restricted passage 42 in the pipe 32 (33), because otherwise this check valve controlled by-pass would too greatly affect the cross connection or interconnection of the shock absorbers. That is, the pistons 25 would act as abutments in one direction only upon non-synchronous movements of the axle ends, if the check valve controlled by-pass was of the same capacity as the restricted passage 42. But with a very small passage at 50, controlled by the check valve 51, the resistance to synchronous and similar movements of the axle will be at a minimum upon the downward movement of the frame, the resistance will be increased upon the rebound or upward movement of the frame, and there will be a still greater resistance upon non-synchronous or dissimilar movements of the ends of the axle relative to the frame. This is because in the first instance the check valve controlled by-passes 50 in the two shock absorbers would slightly relieve the pressure in the opposite compartments of each, in the second instance these by-passes would not operate because the check valves would be closed, and in the third instance the pistons would act as solid abutments except for the slight relief obtained by the by-passes and the leakage that might occur around the pistons.

It will be understood that various forms of the invention other than those described above may be used without departing from the spirit or scope of the invention.

Having thus described my invention, what I claim and desire to secure by Letters Patent is:

1. In a motor vehicle, the combination with the frame and axle, of two shock absorbers connected between the frame and axle, a pipe connection from each side of one shock absorber to the opposite sides of the other shock absorber, and a check valve controlled by-pass for each absorber of less capacity than the smallest opening through said pipe connections.

2. In a motor vehicle, the combination with the frame and axle, of two shock absorbers connected between the frame and axle, a pipe connection from each side of one shock absorber to the opposite sides of the other shock absorber, means comprising a restricted passage in each of said pipe connections, a by-pass for each absorber of smaller capacity than said restricted passage, and a check valve in each of said by-passes.

3. In a motor vehicle, the combination with the frame and axle, of two shock absorbers connected between the frame and the axle near the respective ends of said axle, a by-pass between the sides of each shock absorber open to flow in one direction only, and a connection from each side of each shock absorber to the opposite side of the other shock absorber, each said connection having a restricted portion.

4. In a motor vehicle, the combination with the frame and axle, of a hydraulic shock absorber system comprising a pair of shock absorbers each including a chamber and an oscillatory vane, conduits connecting the chambers on opposite sides of the vanes, said vanes having a passage therethrough, and a one-way valve in the vane passage.

5. In a motor vehicle, the combination with the frame and axle, of a hydraulic shock absorber system comprising shock absorbers connected between the frame and axle, connections between the absorbers tending to cause resistance to anything but synchronous and similar movement of the axle ends and means causing more resistance in one direction than in the other to the movements between the axle and frame.

6. In a motor vehicle, in combination with the frame and axle, of a shock absorbing system comprising a pair of hydraulic shock absorbers arranged intermediate the frame and axle, restricted connections between the shock absorbers permitting fluid flow therebetween, and valve means in the shock absorbers allowing fluid flow therethrough in one direction, said system operating to offer resistance to downward movement of the frame relative to the axle, to offer greater resistance to upward movement of the frame relative to the axle, and to offer still greater resistance to non-synchronous movements of the axle ends.

7. In a motor vehicle, an axle, hydraulic shock absorbers mounted adjacent the ends of the axle, and pipe connections mounted on the axle and extending from each side of each shock absorber to the opposite side of the other shock absorber, each of said pipe connections being formed in removable sections and one of the sections having a smaller diameter passage than the other sections, to restrict the flow through the connections.

8. In a motor vehicle, the combination with a frame and transversely extending axle, of a closed hydraulic shock absorber system comprising a shock absorber for each end of the axle, each of said shock absorbers having a casing rigidly secured to the axle and to the adjacent portion of the frame, a one-way by-pass between the opposite sides of the working chamber in the casing, and intercommunicating conduits connecting said shock absorber casings.

9. In a motor vehicle, an axle, hydraulic shock absorbers mounted adjacent the ends of the axle, and pipe connections mounted on the axle and extending from each side of each shock absorber to the opposite side of the other shock absorber, each of said connections having a portion of its passage formed of a smaller diameter than the other portion of the passage.

In testimony whereof I affix my signature.

ALFRED MOORHOUSE.